United States Patent
Yu et al.

(10) Patent No.: US 10,728,377 B2
(45) Date of Patent: *Jul. 28, 2020

(54) METHOD FOR PERFORMING COOPERATIVE FUNCTION AUTOMATICALLY AND DEVICE USING THE SAME

(71) Applicant: Samsung Electronics Co., Ltd., Gyeonggi-do (KR)

(72) Inventors: Seung-dong Yu, Gyeonggi-do (KR); Woo-yong Chang, Gyeonggi-do (KR); Se-jun Park, Gyeonggi-do (KR); Min-jeong Moon, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/555,016

(22) Filed: Aug. 29, 2019

(65) Prior Publication Data
US 2019/0387093 A1    Dec. 19, 2019

Related U.S. Application Data

(63) Continuation of application No. 16/425,221, filed on May 29, 2019, now Pat. No. 10,582,034, which is a
(Continued)

(30) Foreign Application Priority Data

Aug. 24, 2009 (KR) .................. 10-2009-0078349

(51) Int. Cl.
*H04M 1/725* (2006.01)
*H04W 4/80* (2018.01)
(Continued)

(52) U.S. Cl.
CPC ........ *H04M 1/72533* (2013.01); *G06F 3/065* (2013.01); *G06F 3/067* (2013.01);
(Continued)

(58) Field of Classification Search
CPC .................. H04M 1/72533; G06F 3/1204
See application file for complete search history.

(56) References Cited

U.S. PATENT DOCUMENTS 5,895,459 A    4/1999 Enomoto
6,297,805 B1    10/2001 Adler et al.
(Continued)

FOREIGN PATENT DOCUMENTS

CN    1335563    2/2002
EP    0 798 651    10/1997
(Continued)

OTHER PUBLICATIONS

Korean Office Action dated Apr. 16, 2018 issued in counterpart application No. 10-2017-0094931, 6 pages.
(Continued)

*Primary Examiner* — Tuan H Nguyen
(74) *Attorney, Agent, or Firm* — The Farrell Law Firm, P.C.

(57) ABSTRACT

A first electronic device is provided that detects a second electronic device disposed in an area related to the first electronic device while obtaining video. Based on detecting the second electronic device disposed in the area, the video is automatically transmitted, without receiving a user input for transmitting the video, to the second electronic device such that the transmitted video is provided on a display of the second electronic device. A third electronic device disposed in the area related to the first electronic device is detected while providing a still image on the display of the first electronic device. Based on detecting the third elec-
(Continued)

tronic device disposed in the area, the still image is automatically transmitted, without receiving a user input for transmitting the still image, to the third electronic device such that the transmitted still image is provided on a display of the third electronic device.

19 Claims, 15 Drawing Sheets

Related U.S. Application Data continuation of application No. 16/012,041, filed on Jun. 19, 2018, now Pat. No. 10,484,529, which is a continuation of application No. 15/583,421, filed on May 1, 2017, now Pat. No. 10,027,790, which is a continuation of application No. 15/130,338, filed on Apr. 15, 2016, now Pat. No. 9,706,039, which is a continuation of application No. 14/638,757, filed on Mar. 4, 2015, now Pat. No. 9,326,095, which is a continuation of application No. 12/862,301, filed on Aug. 24, 2010, now Pat. No. 8,995,913.

(51) Int. Cl.

| | | |
|---|---|---|
| *G06F 13/38* | (2006.01) | |
| *G06F 3/12* | (2006.01) | |
| *G06K 15/00* | (2006.01) | |
| *G06F 3/06* | (2006.01) | |
| *H04W 4/02* | (2018.01) | |
| *H04W 4/30* | (2018.01) | |

(52) U.S. Cl.
CPC .......... *G06F 3/0619* (2013.01); *G06F 3/1204* (2013.01); *G06F 3/128* (2013.01); *G06F 3/1236* (2013.01); *G06F 3/1292* (2013.01); *G06F 13/385* (2013.01); *G06K 15/007* (2013.01); *H04M 1/7253* (2013.01); *H04W 4/023* (2013.01); *H04W 4/30* (2018.02); *H04W 4/80* (2018.02)

(56) References Cited

U.S. PATENT DOCUMENTS

| | | | |
|---|---|---|---|
| 6,665,717 | B1 | 12/2003 | Aizono |
| 6,985,589 | B2 | 1/2006 | Morley et al. |
| 7,228,137 | B2 | 6/2007 | Chinomi et al. |
| 8,086,214 | B2 | 12/2011 | Naruse |
| 8,154,472 | B2 | 4/2012 | Yamaguchi et al. |
| 8,244,179 | B2 * | 8/2012 | Dua .................... H04M 1/7253 455/41.2 |
| 2002/0019900 | A1 | 2/2002 | Kim |
| 2002/0196125 | A1 | 12/2002 | Yu et al. |
| 2003/0206635 | A1 | 11/2003 | Morley et al. |
| 2005/0090294 | A1 | 4/2005 | Narasimhan |
| 2005/0135619 | A1 | 6/2005 | Morley et al. |
| 2005/0157329 | A1 | 7/2005 | Park et al. |
| 2005/0276575 | A1 | 12/2005 | Murayama et al. |
| 2006/0187475 | A1 | 8/2006 | Fujioka |
| 2007/0211762 | A1 | 9/2007 | Song et al. |
| 2007/0273609 | A1 | 11/2007 | Yamaguchi et al. |
| 2008/0005272 | A1 | 1/2008 | Kim et al. |
| 2008/0005767 | A1 | 1/2008 | Seo |
| 2008/0084577 | A1 | 4/2008 | Mihira |
| 2008/0089298 | A1 * | 4/2008 | Anschutz .............. H04W 8/005 370/338 |
| 2008/0209011 | A1 | 8/2008 | Stremel et al. |
| 2008/0320094 | A1 | 12/2008 | Tu et al. |
| 2009/0137256 | A1 | 5/2009 | Karaoguz |
| 2009/0147146 | A1 | 6/2009 | Lee et al. |
| 2009/0193474 | A1 | 7/2009 | Stein |
| 2009/0253372 | A1 | 10/2009 | Naruse |
| 2009/0254602 | A1 | 10/2009 | Yoshida |
| 2009/0254980 | A1 | 10/2009 | Kanaparti |
| 2010/0100628 | A1 | 4/2010 | Oka |
| 2010/0250794 | A1 | 9/2010 | Hanks et al. |
| 2012/0127168 | A1 | 5/2012 | Yamaguchi et al. |
| 2013/0184002 | A1 | 7/2013 | Moshfeghi |
| 2019/0057600 | A1 * | 2/2019 | Watanabe .............. G06Q 50/26 |

FOREIGN PATENT DOCUMENTS

| | | |
|---|---|---|
| EP | 0 899 650 | 3/1999 |
| EP | 0 984 363 | 3/2000 |
| EP | 1 109 367 | 6/2001 |
| JP | 11143606 | 5/1999 |
| JP | 2001167019 | 6/2001 |
| JP | 2005354312 | 12/2005 |
| JP | 2006092332 | 4/2006 |
| JP | 2006-217545 | 8/2006 |
| JP | 2007259288 | 10/2007 |
| JP | 2008003574 | 1/2008 |
| JP | 2009-094797 | 4/2009 |
| JP | 2009253476 | 10/2009 |
| JP | 2010011054 | 1/2010 |
| KR | 1020050075559 | 7/2005 |
| KR | 1020080005840 | 1/2008 |
| KR | 1020090011298 | 2/2009 |
| KR | 10-0935382 | 1/2010 |
| KR | 10-1195614 | 10/2012 |
| RU | 2257015 | 7/2005 |
| RU | 2359319 | 6/2009 |
| WO | WO 2005/004415 | 1/2005 |
| WO | WO 2008/085844 | 7/2008 |
| WO | WO 2010/151284 | 12/2010 |

OTHER PUBLICATIONS

Chinese Office Action dated Dec. 18, 2017 issued in counterpart application No. 201610108455.4, 26 pages.
Australian Examination Report dated Feb. 12, 2015 issued in counterpart application No. 2010287253.
European Search Report dated Oct. 21, 2014 issued in counterpart application No. 10173898.7-1954.
Australian Examination Report dated Oct. 24, 2014 issued in counterpart application No. 2010287253.
Chinese Office Action dated Dec. 1, 2014 issued in counterpart application No. 201010260479.4.
Russian Office Action dated Dec. 4, 2014 issued in counterpart application No. 2012111311/08.
Japanese Office Action dated Jun. 12, 2014 issued in counterpart application No. 2010-187070.
Chinese Office Action dated Jul. 3, 2014 issued in counterpart application No. 201010260479.4.
Russian Office Action dated Apr. 10, 2015 issued in counterpart application No. 2012111311/08.
Chinese Office Action dated May 6, 2015 issued in counterpart application No. 201010260479.4.
Notice of Acceptance Office Action dated Jul. 10, 2015 issued in counterpart application No. 2010287253, 3 pages.
Korean Office Action dated Sep. 16, 2015 issued in counterpart application No. 10-2009-0078349, 7 pages.
Russian Office Action dated May 21, 2019 issued in counterpart application No. 2015132722/08, 8 pages.

* cited by examiner

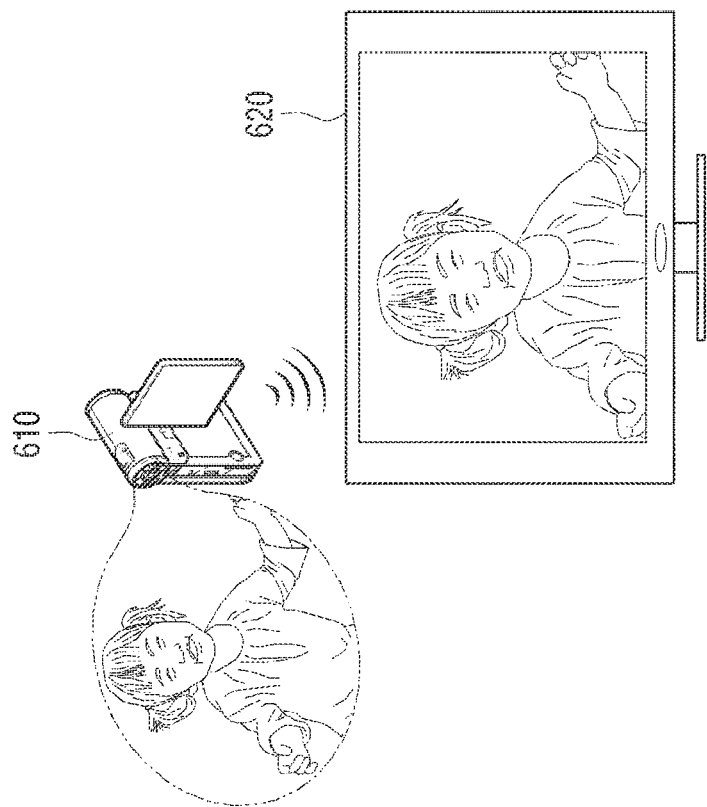
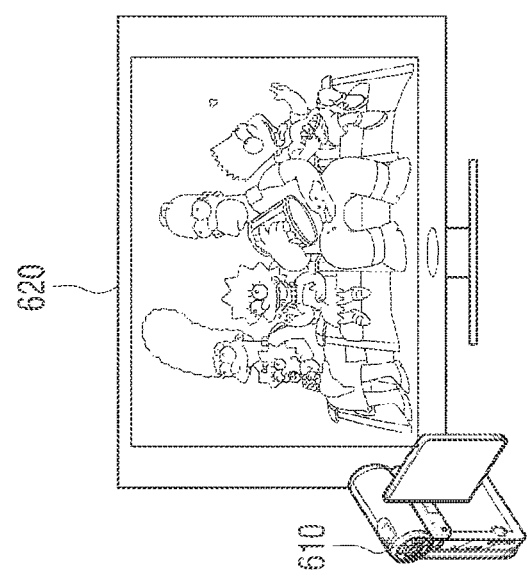

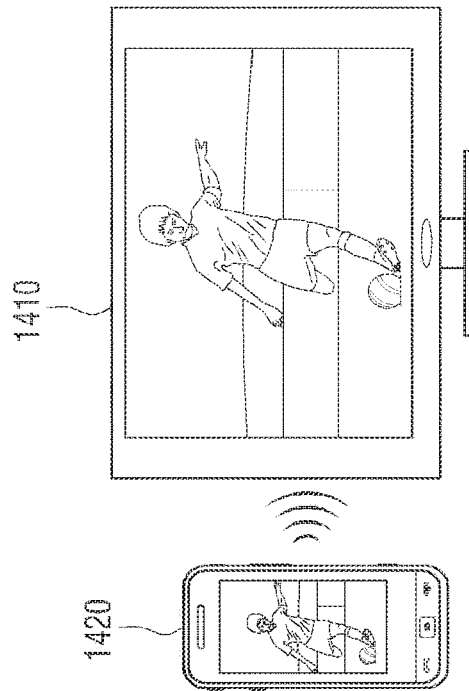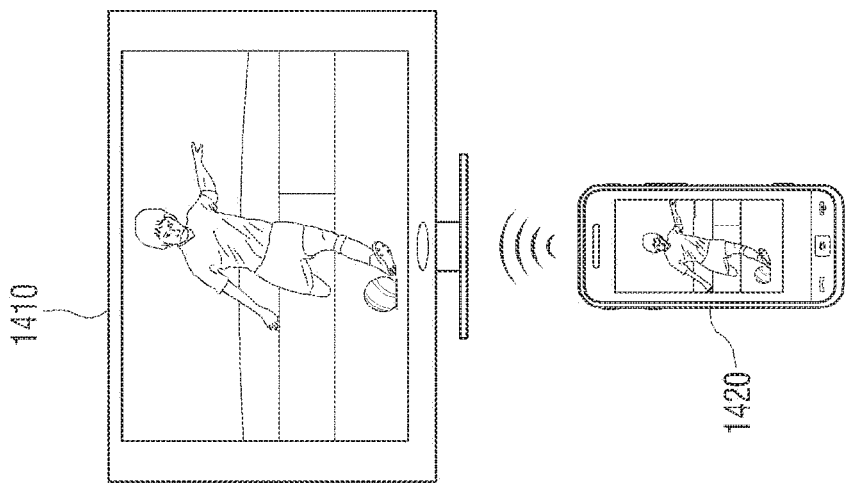

METHOD FOR PERFORMING COOPERATIVE FUNCTION AUTOMATICALLY AND DEVICE USING THE SAME

CROSS-REFERENCE TO RELATED APPLICATION(S)

This application is a continuation of U.S. patent application Ser. No. 16/425,221, filed on May 29, 2019, which is a continuation of U.S. patent application Ser. No. 16/012,041, filed on Jun. 19, 2018, which is a continuation of U.S. patent application Ser. No. 15/583,421, filed on May 1, 2017, which issued as U.S. Pat. No. 10,027,790 on Jul. 17, 2018, which is a continuation of U.S. patent application Ser. No. 15/130,338, filed on Apr. 15, 2016, which issued as U.S. Pat. No. 9,706,039 on Jul. 11, 2017, which is a continuation of U.S. patent application Ser. No. 14/638,757, filed on Mar. 4, 2015, which issued as U.S. Pat. No. 9,326,095 on Apr. 26, 2016, which is a continuation of U.S. application Ser. No. 12/862,301, filed on Aug. 24, 2010, which issued as U.S. Pat. No. 8,995,913 on Mar. 31, 2015, and claims priority under 35 U.S.C. § 119(a) to Korean Patent Application No. 10-2009-0078349, filed Aug. 24, 2009, in the Korean Intellectual Property Office, the contents of each of which are incorporated herein by reference.

BACKGROUND OF THE INVENTION

1. Field of the Invention

The present invention relates generally to a method for performing a cooperative function and a device using the same, and more particularly, to a method for allowing a plurality of devices to perform a single cooperative function together, and a device using the same.

2. Description of the Related Art

With the advent of various digital devices, the number of digital devices that a single user possesses has increased significantly.

These various digital devices have provided increased convenience, and continue to become more sophisticated by incorporating multi-functions.

The user, however, still pursues digital devices having more advanced and sophisticated functions.

However, a digital device is limited in the number of functions it can perform on its own. Therefore, a method for converging and combining each device owned by the user is required to create a new function which can be performed by a plurality of digital devices.

SUMMARY OF THE INVENTION

The present invention has been made to address at least the above problems and/or disadvantages and to provide at least the advantages described below. Accordingly, an aspect of the present invention provides a method for performing a cooperative function if it is determined that there are other devices in the surrounding area, and a device using the same.

According to an aspect of the present invention, a first electronic device is provided that includes a display, a camera circuitry, a memory configured to store instructions, and one or more processors configured to execute the instructions stored in the memory. A second electronic device disposed in an area related to the first electronic device is detected while obtaining video via the camera circuitry. Based on detecting the second electronic device disposed in the area, the video is automatically transmitted, without receiving a user input for transmitting the video being obtained via the camera circuitry, to the second electronic device such that the transmitted video is provided on a display of the second electronic device. A third electronic device disposed in the area related to the first electronic device is detected while providing a still image on the display of the first electronic device. The still image is previously stored by the first electronic device. Based on detecting the third electronic device disposed in the area, the still image is automatically transmitted, without receiving a user input for transmitting the still image being provided on the display of the first electronic device, to the third electronic device such that the transmitted still image is provided on a display of the third electronic device.

BRIEF DESCRIPTION OF THE DRAWINGS

The above and other aspects, features and advantages of the present invention will be more apparent from the following detailed description when taken in conjunction with the accompanying drawings, in which:

FIGS. 1A to 7B are diagrams illustrating a concept of performing a cooperative function automatically by devices in adjacent areas, according to embodiments of the present invention;

FIGS. 12A to 14B are diagrams illustrating a method for performing different cooperative functions automatically according to locations of devices in adjacent areas, according to an embodiment of the present invention.

DETAILED DESCRIPTION OF EMBODIMENTS OF THE PRESENT INVENTION

Figure 1B:
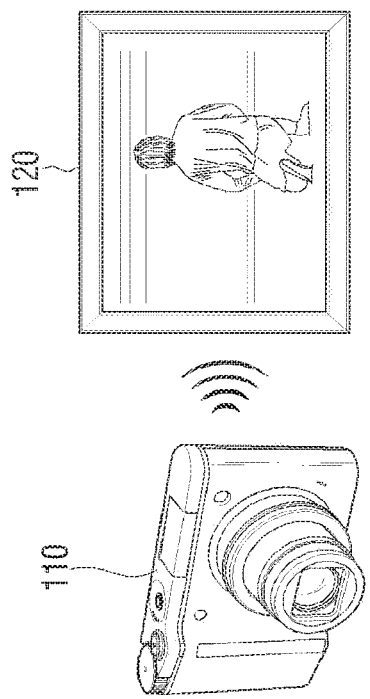

Embodiments of the present invention are described in detail with reference to the accompanying drawings.

In the following description, the same or similar reference numerals may be used for the same or similar elements when they are illustrated in different drawings. Detailed descriptions of constructions or processes known in the art may be omitted to avoid obscuring the subject matter of the present invention.

Figure 1A:
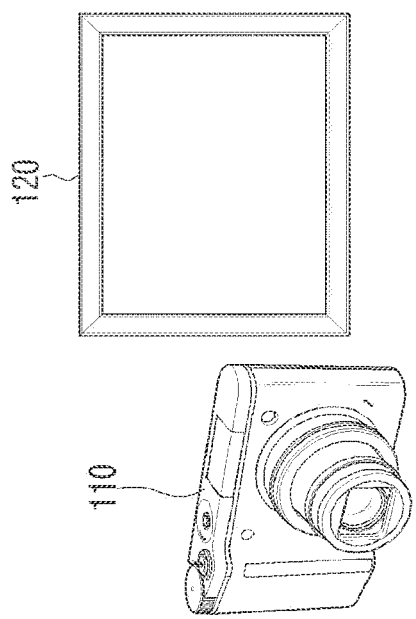

FIGS. 1A and 1B are diagrams illustrating a method for performing a cooperative function automatically according to a first embodiment of the present invention. FIG. 1A illustrates that a digital camera 110 is adjacent to an electronic frame 120 (within a predetermined distance).

If the digital camera 110 is adjacent to the electronic frame 120 as illustrated in FIG. 1A, a cooperative function is automatically performed by the digital camera 110 and the electronic frame 120 as illustrated in FIG. 1B.

FIG. IB illustrates that the digital camera 110 transmits stored photos to the electronic frame 120, and the electronic frame 120 reproduces the photos received from the digital camera 110 as a slideshow.

In order to perform the above cooperative function, the digital camera 110 is preset to transmit stored photos to the electronic frame 120 if the digital camera 110 is adjacent to the electronic frame 120.

In addition, in order to perform the above cooperative function, the electronic frame 120 is preset to reproduce the photos received from the digital camera 110 as a slideshow if the electronic frame 120 is adjacent to the digital camera 110.

Once the cooperative function starts between the digital camera 110 and the electronic frame 120, the cooperative function continues even if the distance between the two becomes wide.

Figure 2A:
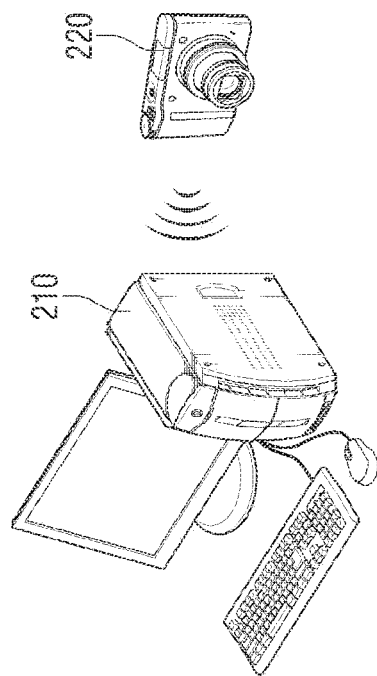
Figure 2B:
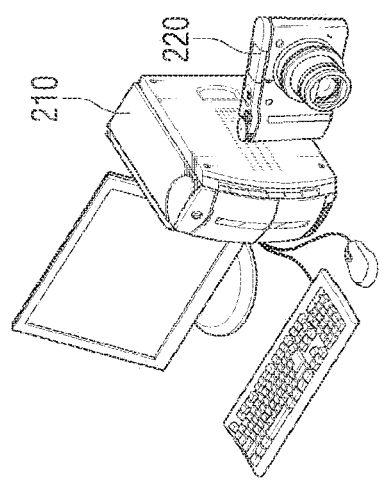

FIGS. 2A and 2B are diagrams illustrating a method for performing a cooperative function automatically, according to a second embodiment of the present invention. FIG. 2A illustrates that a digital camera 220 is adjacent to a Personal Computer (PC) 210.

If the digital camera 220 is adjacent to the PC 210 as illustrated in FIG. 2A, a cooperative function is automatically performed by the digital camera 220 and the PC 210, as illustrated in FIG. 2B.

FIG. 2B illustrates that the digital camera 220 transmits additionally stored photos to the PC 210, and the PC 210 backs-up the photos received from the digital camera 220 in a designated folder of the Hard Disk Drive (HDD).

In order to perform the above cooperative function, the digital camera 220 is preset to transmit additionally stored photos to the PC 210 if the digital camera 220 is adjacent to the PC 210.

In addition, in order to perform the above cooperative function, the PC 210 is preset to back-up the photos received from the digital camera 220 in a designated folder of the HDD if the PC 210 is adjacent to the digital camera 220. Once the cooperative function starts between the PC 210 and the digital camera 220, the cooperative function continues even if the distance between the two becomes wide.

Figure 3B:
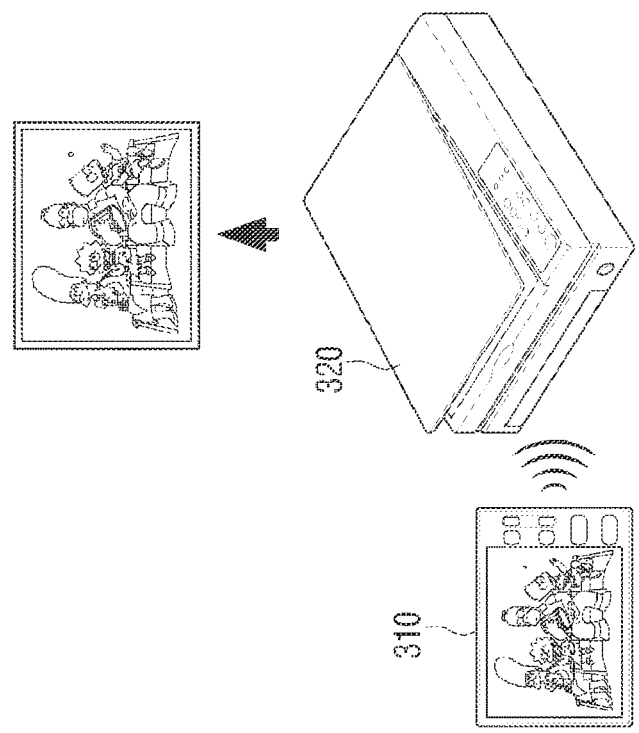
Figure 3A:
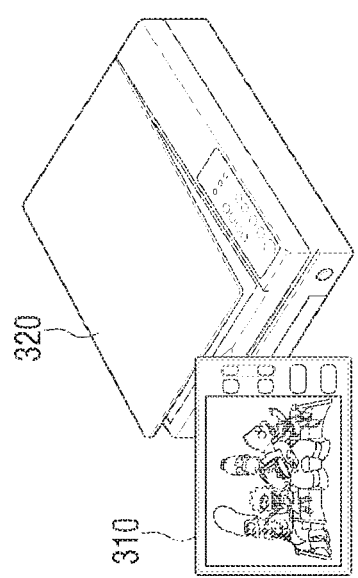

FIGS. 3A and 3B are diagrams illustrating a method for performing a cooperative function automatically, according to a third embodiment of the present invention. FIG. 3A illustrates that a digital camera 310, which is reproducing photos, is adjacent to a printer 320.

If the digital camera 310 is adjacent to the printer 320 as illustrated in FIG. 3A, a cooperative function is automatically performed by the digital camera 310 and the printer 320, as illustrated in FIG. 3B.

FIG. 3B illustrates that the digital camera 310 transmits photos which are being reproduced to the printer 320, and the printer 320 prints the photos received from the digital camera 310.

In order to perform the above cooperative function, the digital camera 310 is preset to transmit photos that are currently being reproduced to the printer 320 if the digital camera 310 is adjacent to the printer 320.

In addition, in order to perform the above cooperative function, the printer 320 is preset to print the photos received from the digital camera 310 if the printer 320 is adjacent to the digital camera 310.

If an MP3 player, which is reproducing music, is adjacent to the printer 320, the MP3 player transmits information regarding the current music to the printer 320 and the printer 320 may download the lyrics or music book of the current music through the Internet and print them.

Figure 4B:
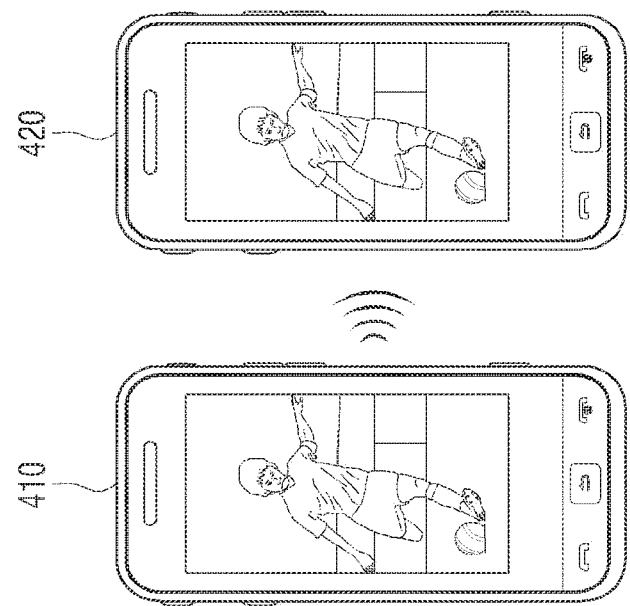
Figure 4A:
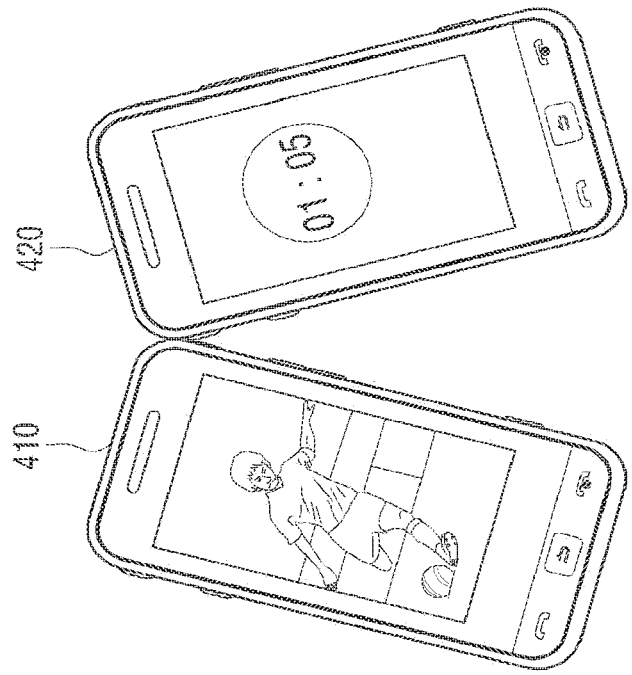

FIGS. 4A and 4B are diagrams illustrating a method for performing a cooperative function automatically, according to a fourth embodiment of the present invention. FIG. 4A illustrates that a mobile phone-A 410, which is reproducing photos, is adjacent to a mobile phone-B 420, which is in a standby mode.

If the mobile phone-A 410 is adjacent to the mobile phone-B 420 as illustrated in FIG. 4A, a cooperative function is automatically performed by the mobile phone-A 410 and the mobile phone-B 420, as illustrated in FIG. 4B. FIG. 4B illustrates that the mobile phone-A 410 transmits photos, which are currently being reproduced, to the mobile phone-B 420, and the mobile phone-B 420 changes its mode from a standby mode to a photo play mode, and displays the photos received from the mobile phone 410 on a screen.

In order to perform the above cooperative function, the mobile phone-A 410 is preset to transmit photos, which are currently being reproduced to the mobile phone-B 420, if the mobile phone-A 410 is adjacent to the mobile phone-B 420. In addition, in order to perform the above cooperative function, the mobile phone 420 is preset to display the photos received from the mobile phone-A 410 if the mobile phone 420-B is adjacent to the mobile phone-A 410.

Once the cooperative function starts between the mobile phone-A 410 and the mobile phone-B 420, the cooperative function continues even if the distance between the two becomes wide.

Figure 5B:
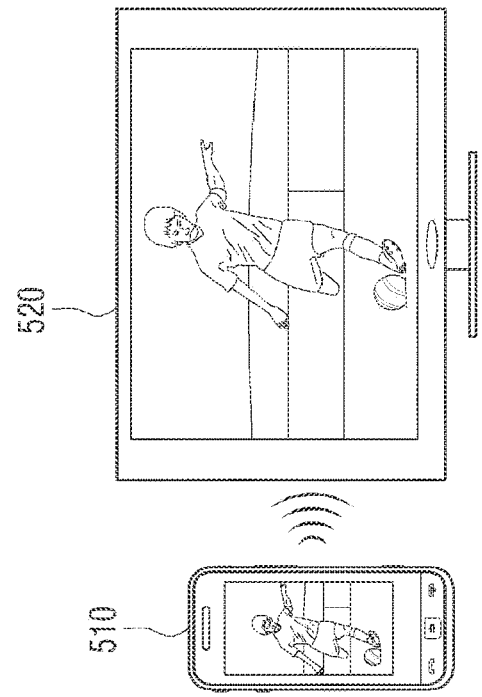
Figure 5A:
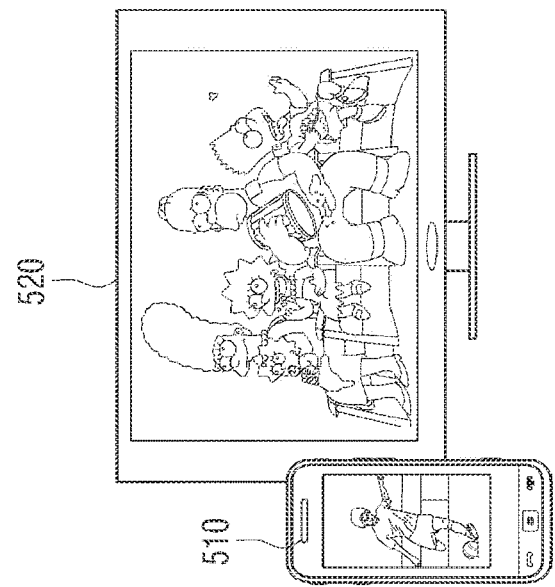

FIGS. 5A and 5B are diagrams illustrating a method for performing a cooperative function automatically, according to a fifth embodiment of the present invention. FIG. 5A illustrates that a mobile phone-A 510, which is reproducing photos, is adjacent to a television (TV) 520, which is reproducing broadcast. If the mobile phone 510 is adjacent to the TV 520 as illustrated in FIG. 5A, a cooperative function is automatically performed by the mobile phone 510 and the TV 520, as illustrated in FIG. 5B.

FIG. 5B illustrates that the mobile phone 510 transmits photos, which are currently being reproduced, to the TV 520, and the TV 520 stops reproducing broadcast and reproduces the photos received from the mobile phone 510.

In order to perform the above cooperative function, the mobile phone 510 is preset to transmit photos, which are currently being reproduced, to the TV 520 if the mobile phone 510 is adjacent to the TV 520.

In addition, in order to perform the above cooperative function, the TV 520 is preset to reproduce the photos received from the mobile phone 510 if the TV 520 is adjacent to the mobile phone 510.

Once the cooperative function starts between the mobile phone 510 and the TV 520, the cooperative function continues even if the distance between the two becomes wide.

FIGS. 6A and 6B are diagrams illustrating a method for performing a cooperative function automatically, according to a sixth embodiment of the present invention. FIG. 6A illustrates that a digital camcorder 610 is adjacent to a TV 620, which is reproducing broadcast.

If the digital camcorder 610 is adjacent to the TV 620 as illustrated in FIG. 6A, a cooperative function is automatically performed by the digital camcorder 610 and the TV 620, as illustrated in FIG. 6B.

FIG. 6B illustrates that the digital camcorder 610 transmits images currently being photographed to the TV 620, and the TV 620 stops reproducing broadcast and reproduces the images received from the digital camcorder 610. In order to perform the above cooperative function, the digital camcorder 610 is preset to transmit images, which are currently being photographed, to the TV 620 if the digital camcorder 610 is adjacent to the TV 620.

In addition, in order to perform the above cooperative function, the TV 620 is preset to reproduce the images received from digital camcorder 610 if the TV 620 is adjacent to the digital camcorder 610.

Once the cooperative function starts between the digital camcorder 610 and the TV 620, the cooperative function continues even if the distance between the two becomes wide.

Figure 7A:
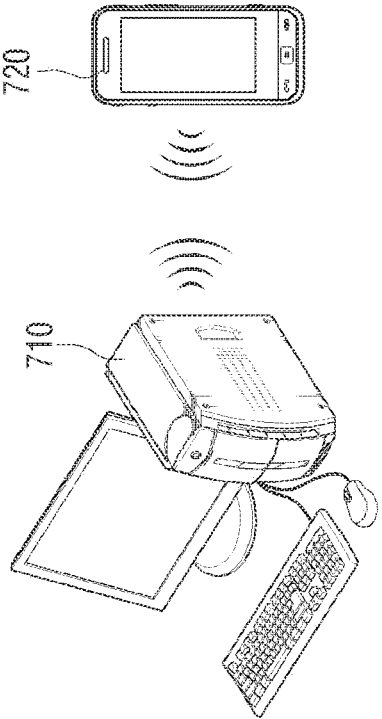
Figure 7B:
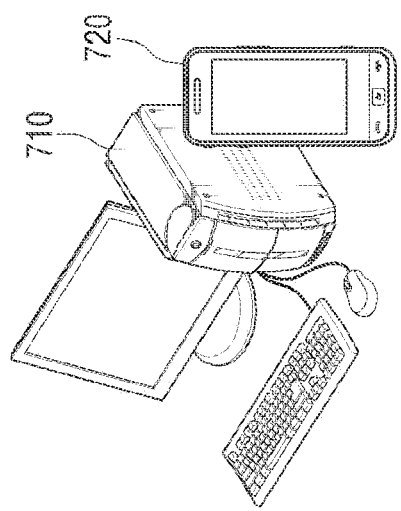

FIGS. 7A and 7B are diagrams illustrating a method for performing a cooperative function automatically, according to a seventh embodiment of the present invention. FIG. 7A illustrates that a mobile phone 720 is adjacent to a PC 710.

If the mobile phone 720 is adjacent to the PC 710 as illustrated in FIG. 7A, a cooperative function is automatically performed by the mobile phone 720 and the PC 710 as illustrated in FIG. 7B.

FIG. 7B illustrates that the mobile phone 720 transmits stored schedule information to the PC 710, and the PC 710 backs-up the schedule information received from the mobile phone 720 in a designated folder.

In order to perform the above cooperative function, the mobile phone 720 is preset to transmit stored schedule information to the PC 710 if the mobile phone 720 is adjacent to the PC 710.

In addition, in order to perform the above cooperative function, the PC 710 is preset to back-up the schedule information received from the mobile phone 720 in a designated folder if the PC 710 is adjacent to the mobile phone 720. Once the cooperative function starts between the mobile phone 720 and the PC 710, the cooperative function continues even if the distance between the two becomes wide.

Figure 8:
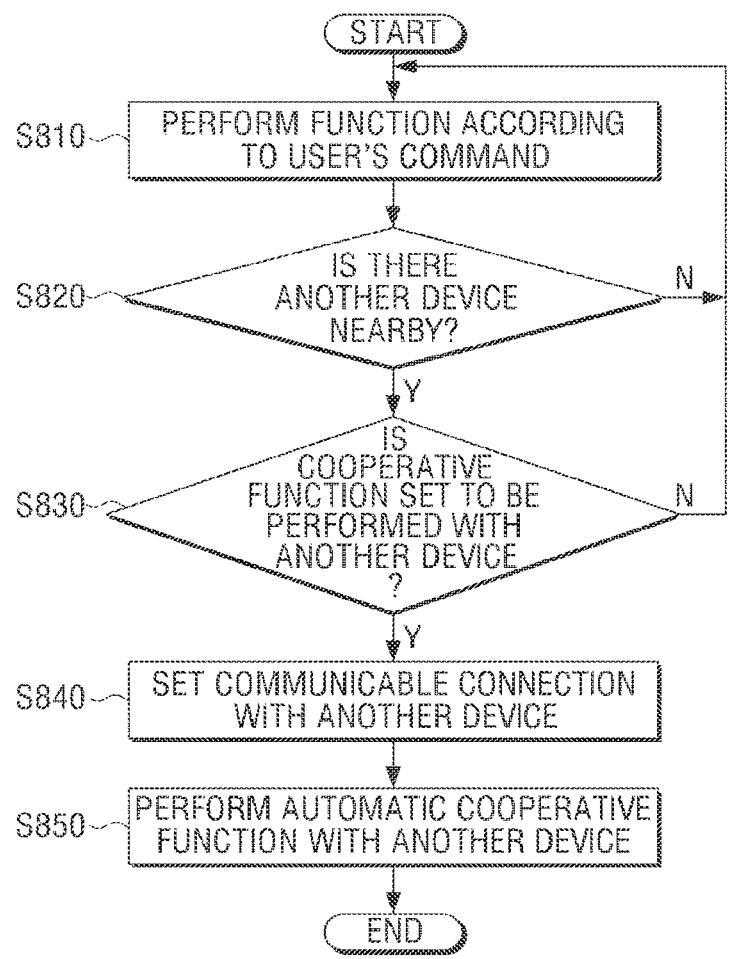
FIG. 8 is a flowchart illustrating a method for performing a cooperative function automatically among devices in adjacent areas, according to an embodiment of the present invention.

FIG. 8 is a flowchart illustrating a method for performing a cooperative function automatically among devices in adjacent areas, according to an embodiment of the present invention.

As illustrated in FIG. 8, a device performs a function according to a user's command in step S810, and determines whether there is another device in surrounding areas in step S820.

If it is determined that there is another device nearby in step S820, the device determines whether an automatic cooperative function is set between the device and the another device in step S830.

If it is determined that an automatic cooperative function is set in step S830, the device sets a communicable connection with the another device in step S840.

Subsequently, the device performs the cooperative function with the another device automatically in step S850.

Figure 9B:
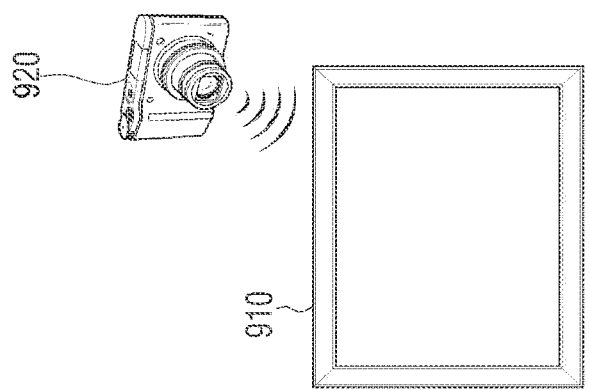
FIGS. 9A to 10B are diagrams illustrating a concept of performing a cooperative function automatically which is set in advance considering locations of devices in adjacent areas, according to an embodiment of the present invention.
Figure 9A:
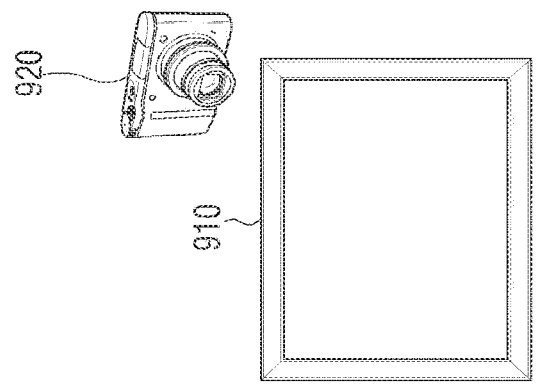

FIGS. 9A and 9B and FIGS. 10A and 10B are diagrams illustrating a method for performing a cooperative function automatically, according to an eighth embodiment of the present invention. FIG. 9A illustrates that a digital camera 920 is adjacent to the 'back' of an electronic frame 910.

If the digital camera 920 is adjacent to the back of the electronic frame 910 as illustrated in FIG. 9A, a cooperative function is automatically performed by the digital camera 920 and the electronic frame 910 as illustrated in FIG. 9B. FIG. 9B illustrates that the digital camera 920 transmits stored photos to the electronic frame 910, and the electronic frame 910 backs-up the photos received from the digital camera 920 in its own storage medium.

In order to perform the above cooperative function, the digital camera 920 is preset to transmit stored photos to the electronic frame 910 if the digital camera 920 is adjacent to the back of the electronic frame 910.

In addition, in order to perform the above cooperative function, the electronic frame 910 is preset to back-up the photos received from the digital camera 920 if the back of electronic frame 910 is adjacent to the digital camera 920. Once the cooperative function starts between the digital camera 920 and the electronic frame 910, the cooperative function continues even if the distance between the two becomes wide.

Figure 10A:
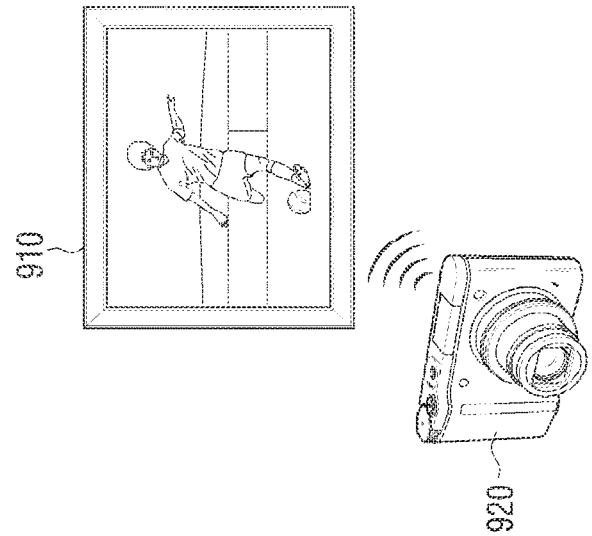

FIG. 10A illustrates that the digital camera 920 is adjacent to the 'front' of the electronic frame 910.

Figure 10B:
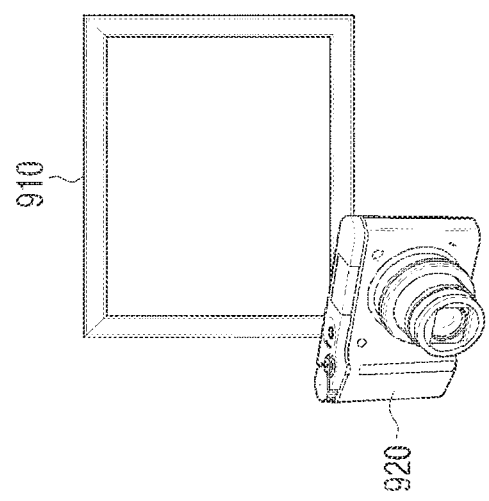

If the digital camera 920 is adjacent to the front of the electronic frame 910 as illustrated in FIG. 10A, a cooperative function is automatically performed by the digital camera 920 and the electronic frame 910 as illustrated in FIG. 10B. FIG. 10B illustrates that the digital camera 920 transmits stored photos to the electronic frame 910, and the electronic frame 910 reproduces the photos received from the digital camera 920 as a slideshow.

In order to perform the above cooperative function, the digital camera 920 is preset to transmit stored photos to the electronic frame 910 if the digital camera 920 is adjacent to the front of the electronic frame 910.

In addition, in order to perform the above cooperative function, the electronic frame 910 is preset to reproduce the photos received from the digital camera 920 as a slideshow if the front of electronic frame 910 is adjacent to the digital camera 920.

Once the cooperative function starts between the digital camera 920 and the electronic frame 910, the cooperative function continues even if the distance between the two becomes wide.

Figure 11:
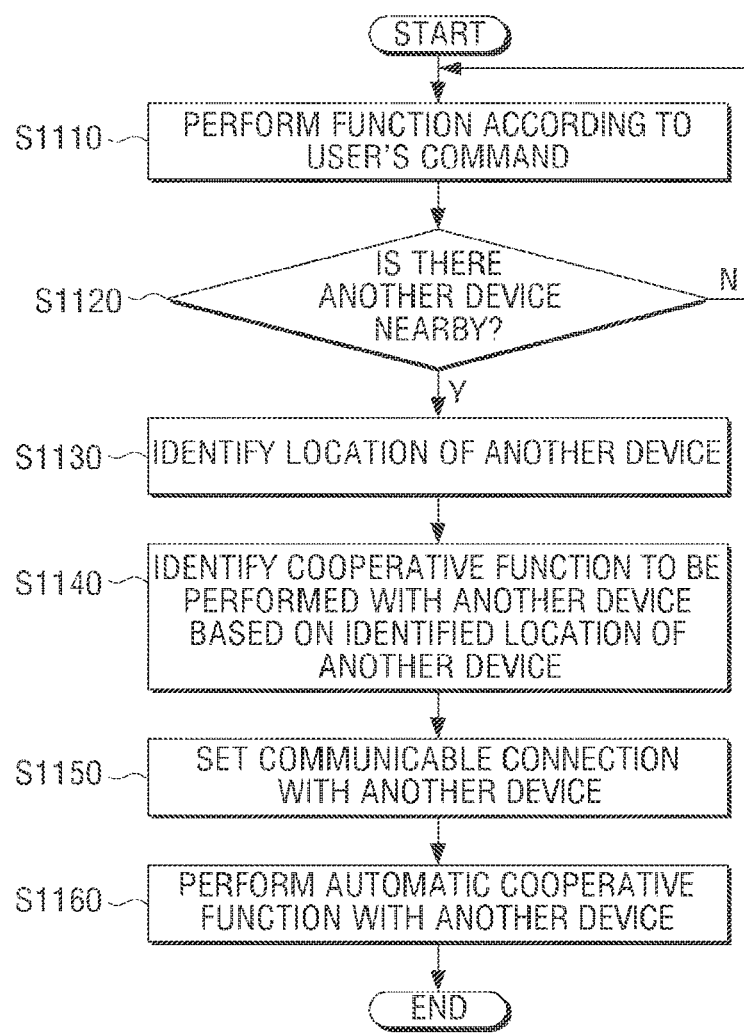
FIG. 11 is a flowchart illustrating a method for performing different cooperative functions automatically considering locations of devices in adjacent areas, according to an embodiment of the present invention.

FIG. 11 is a flowchart illustrating a method for performing different cooperative functions automatically considering locations of devices in adjacent areas, according to an embodiment of the present invention.

As illustrated in FIG. 11, a device performs a function according to a user's command in step SI 110 and determines whether there is another device in surrounding areas in step S1120.

If it is determined that there is another device nearby in step SI 120, the device identifies the location of the another device in step SI 130.

Subsequently, the device identifies an automatic cooperative function that should be performed together with the another device based on the location of the another device in step S1140.

The device sets a communicable connection with the another device in step SI 150. Subsequently, the device performs the cooperative function with the another device automatically in step SI 160.

FIGS. 12A and 12B, FIGS. 13A and 13B, and FIGS. 14A and 14B are diagrams illustrating a method for performing a cooperative function automatically, according to a ninth embodiment of the present invention.

Figure 12A:
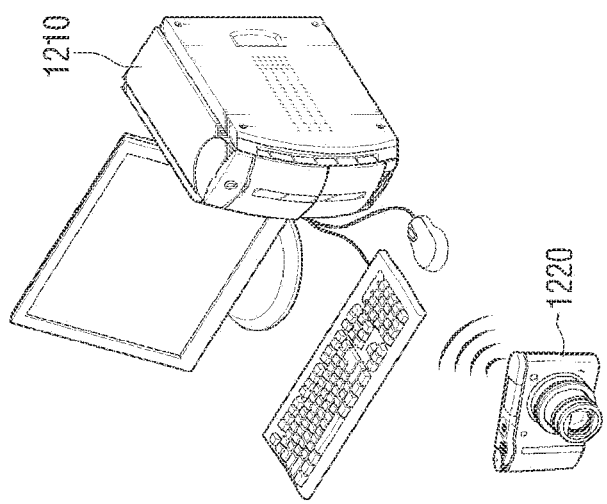
Figure 12B:
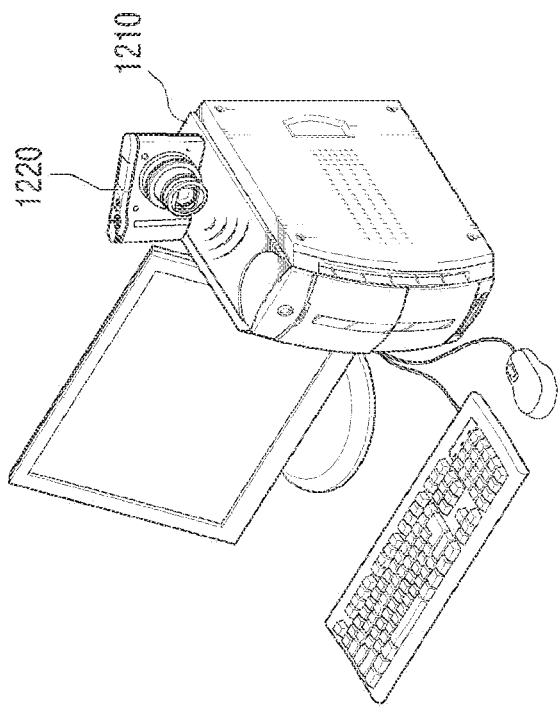

FIG. 12A illustrates that a digital camera 1220 is located on the main body of a PC 1210, and FIG. 12B illustrates that the digital camera 1220 is located in front of the main body of the 1210.

As illustrated in FIG. 12A, if the digital camera 1220 is located on the main body of the PC 1210, the digital camera 1220 may transmit stored photos to the PC 1210 and the PC 1210 may back-up the photos received from the digital camera 1220 in its own storage medium as a cooperative function is automatically performed by the digital camera 1220 and the PC 1210.

As illustrated in FIG. 12B, if the digital camera 1220 is located in front of the main body of the PC 1210, the digital camera 1220 may transmit stored photos to the PC 1210 and the PC 1210 may reproduce the photos received from the digital camera 1220 as a slideshow as a cooperative function is automatically performed by the digital camera 1220 and the PC 1210.

Figure 13B:
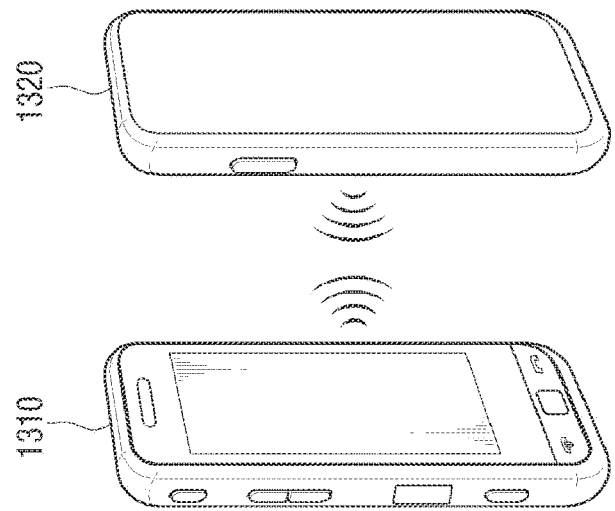
Figure 13A:
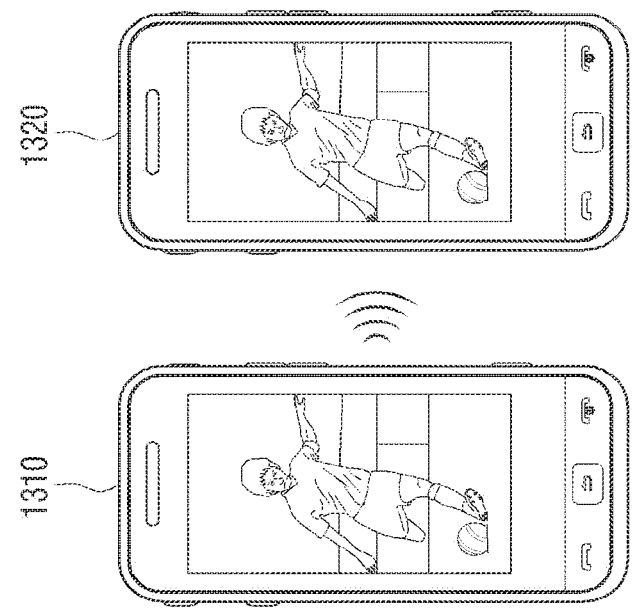

As illustrated in FIG. 13A, if the liquid crystal of a mobile phone-A 1310 and the liquid crystal of a mobile phone-B 1320 are placed side by side facing an upper or lower direction, the address book stored in the mobile phone-A 1310 may be synchronized with the address book stored in the mobile phone-B 1320 as a cooperative function is automatically performed by the mobile phone-A 1310 and the mobile phone-B 1320.

As illustrated in FIG. 13B, if the mobile phone-A 1310 and the mobile phone-B 1320 face each other, the photos stored in the mobile phone-A 1310 may be synchronized with the photos stored in the mobile phone-B 1320 as a cooperative function is automatically performed by the mobile phone-A 1310 and the mobile phone-B 1320.

As illustrated in FIG. 14A, if a mobile phone 1420 is located in front of a TV 1410, the mobile phone 1420 may transmit stored photos to the TV 1410, and the TV 1410 may reproduce the photos received from the mobile phone 1420 as a slideshow as a cooperative function is automatically performed by the mobile phone 1420 and the TV 1410.

In addition, as illustrated in FIG. 14B, if the mobile phone 1420 is located next to the TV 1410, the contents stored in the mobile phone 1420 may be synchronized with the contents stored in the hard-disk of the TV 1410 or the contents stored in the USB connected to the TV.

In the above embodiments, a cooperative function is automatically performed when two devices become close to each other, but this is only an example. A cooperative function may also be automatically performed when two devices are in contact with each other.

In this case, the type of cooperative function to be performed may be determined depending on which part of a device is contacted by another device. For example, if the device is in contact with the "front" of another device, "a first" cooperative function may be performed, and if the device is in contact with the "back" of another device, "a second" cooperative function may be performed. To sense which part of the device in contact with another device, sensors should be formed on the surface of the another device.

In addition, the type of cooperative function to be performed may be determined depending on which part of a device contacts which part of another device. For example, if the "front" of the device contacts the "front" of another device, "the first" cooperative function may be performed, and if the "back" of the device contacts the "back" of another device, "the second" cooperative function may be performed. The type of cooperative function performed by devices may be determined by a user. In addition, the type of cooperative function that is already set may be changed by a user.

A cooperative function may be automatically set according to the properties of a device. For example, since the properties of a camera include taking pictures and the properties of a printer includes printing, a cooperative function may be automatically set as the camera taking pictures and the printer printing the photographed pictures.

The devices mentioned in the above embodiments are only examples.

Figure 15:
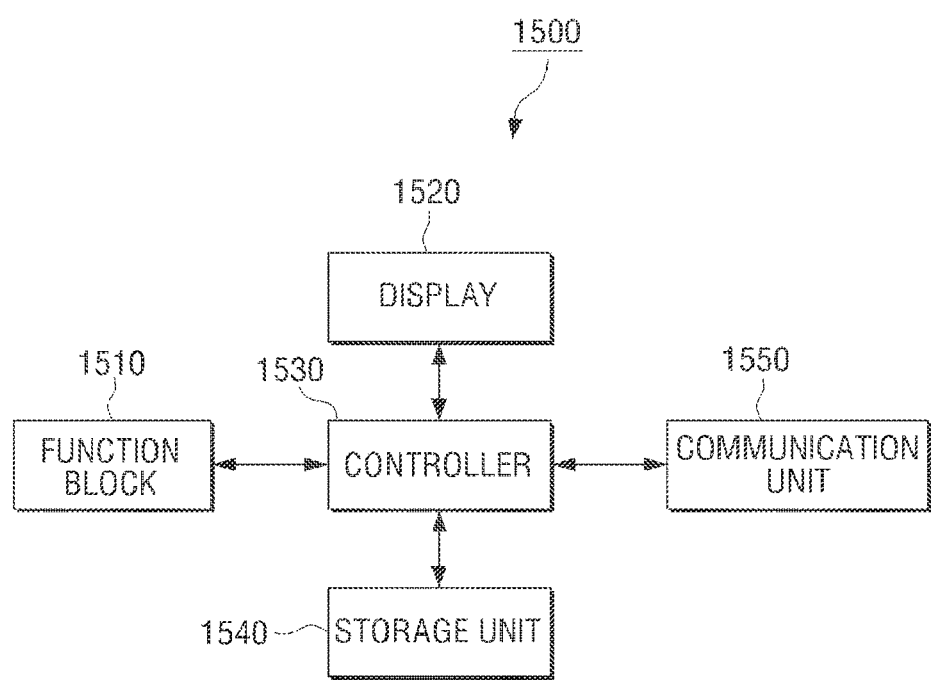
FIG. 15 is a block diagram of a device, according to an embodiment of the present invention.

The technical feature of the present invention may be applied to other devices. FIG. 15 is a block diagram of a device to which the present invention is applicable. The device includes a function block 1510, a display 1520, a controller 1530, a storage unit 1540 and a communication unit 1550.

The function block 1510 performs an original function of the device. If the device is a mobile phone, the function block performs telephone communication and SMS, and if the device is a TV, the function block 1510 performs broadcast reception and reproduction.

The display 1520 displays the performance result of the function block 1510 and the GUI.

The storage unit 1540 is a storage medium to store programs necessary to perform the function of the function block 1510 and to provide the GUI, contents, and other data.

The communication unit 1550 senses whether another device approaches a device in surrounding areas, and sets a communicable connection between the device and a sensed device.

In addition, the communication unit 1550 senses the location of another device in surrounding areas. For example, the communication unit 1550 senses from which sides among front, back, left and right another device approaches. To do so, the communication unit 1550 may use a plurality of directional antennas and a plurality of directional sensors.

Meanwhile, the communication unit 1550 may have a bi-directional wireless communication module to sense the location of other devices in surrounding areas. In this case, there is no limitation to the method of wireless communication of the bi-directional wireless communication module. Therefore, the wireless communication may be realized as infrared communication, sound wave communication, an RF communication, or wireless network communication. The controller 1530 controls the device to perform a cooperative function with another device through the process illustrated in FIGS. 8 and 11. While the invention has been shown and described with reference to certain embodiments thereof, it will be understood by those skilled in the art that various changes in form and detail may be made therein without departing from the spirit and scope of the invention, as defined by the appended claims.

What is claimed is:

1. A first electronic device, comprising:
   a display;
   a camera circuitry;
   a memory configured to store instructions; and
   one or more processors configured to execute the instructions stored in the memory to:
      detect a second electronic device disposed in an area related to the first electronic device while obtaining video via the camera circuitry;
      based on detecting the second electronic device disposed in the area, automatically, without receiving a user input for transmitting the video being obtained via the camera circuitry, transmit the video to the second electronic device such that the transmitted video is provided on a display of the second electronic device;
      detect a third electronic device disposed in the area related to the first electronic device while providing a still image on the display of the first electronic device, wherein the still image is previously stored by the first electronic device; and
      based on detecting the third electronic device disposed in the area, automatically, without receiving a user input for transmitting the still image being provided on the display of the first electronic device, transmit the still image to the third electronic device such that the transmitted still image is provided on a display of the third electronic device.

2. The first electronic device of claim 1, wherein the area is defined by a predetermined distance from the first electronic device.

3. The first electronic device of claim 1, further comprising communication circuitry configured to communicate with the second electronic device and the third electronic device,
wherein the second electronic device and the third electronic device disposed in the area is detected via the communication circuitry.

4. The first electronic device of claim 1, wherein the one or more processors are further configured to execute the instructions to:
maintain transmission of the video to the second electronic device while the second electronic device is disposed outside of the area.

5. The first electronic device of claim 1, wherein the second electronic device initially displays a second video different than the transmitted video, and displays the transmitted video instead of the second video in response to receiving the transmitted video from the first electronic device.

6. The first electronic device of claim 1, wherein the third electronic device initially displays a second still image different that the transmitted still image, and displays the transmitted still image instead of the second still image in response to receiving the transmitted still image from the first electronic device.

7. The first electronic device of claim 1, wherein the one or more processors are further configured to execute the instructions to:
based on detecting that the second electronic device is disposed in the area, establish a wireless connection between the first electronic device and the second electronic device.

8. The first electronic device of claim 7, wherein the wireless connection between the first electronic device and the second electronic device is maintained when the second electronic device is outside of the area.

9. The first electronic device of claim 1, wherein the one or more processors are further configured to execute instructions to:
based on detecting that the third electronic device is disposed in the area, establish a wireless connection between the first electronic device and the third electronic device.

10. The first electronic device of claim 9, wherein the wireless connection between the first electronic device and the third electronic device is maintained when the third electronic device is outside of the area.

11. A method of a first electronic device, the method comprising:

detecting a second electronic device disposed in an area related to the first electronic device while obtaining video;
based on detecting the second electronic device disposed in the area, automatically, without receiving a user input for transmitting the video, transmitting the video to the second electronic device such that the transmitted video is provided on a display of the second electronic device;
detecting a third electronic device disposed in the area related to the first electronic device while providing a still image on the display of the first electronic device, wherein the still image is previously stored by the first electronic device; and
based on detecting the third electronic device disposed in the area, automatically, without receiving a user input for transmitting the still image, transmitting the still image to the third electronic device such that the transmitted still image is provided on a display of the third electronic device.

12. The method of claim 11, wherein the area is defined by a predetermined distance from the first electronic device.

13. The method of claim 11, further comprising:
maintaining transmission of the video to the second electronic device while the second electronic device is disposed outside of the area.

14. The method of claim 11, wherein the second electronic device initially displays a second video different than the transmitted video, and displays the transmitted video instead of the second video in response to receiving the transmitted video from the first electronic device.

15. The method of claim 11, wherein the third electronic device initially displays a second still image different that the transmitted still image, and displays the transmitted still image instead of the second still image in response to receiving the transmitted still image from the first electronic device.

16. The method of claim 11, further comprising:
based on detecting that the second electronic device is disposed in the area, establishing a wireless connection between the first electronic device and the second electronic device.

17. The method of claim 16, wherein the wireless connection between the first electronic device and the second electronic device is maintained when the second electronic device is outside of the area.

18. The method of claim 11, further comprising:
based on detecting that the third electronic device is disposed in the area, establishing a wireless connection between the first electronic device and the third electronic device.

19. The method of claim 18, wherein the wireless connection between the first electronic device and the third electronic device is maintained when the third electronic device is outside of the area.

* * * * *